United States Patent

[11] 3,612,304

| [72] | Inventor | Paul H. Troth<br>Euclid, Ohio |
|---|---|---|
| [21] | Appl. No. | 27,768 |
| [22] | Filed | Apr. 13, 1970 |
| [45] | Patented | Oct. 12, 1971 |
| [73] | Assignee | McNeil Corporation<br>Akron, Ohio |

[54] STORAGE STACKER UNIT AND A TRANSFER UNIT THEREFOR
1 Claim, 3 Drawing Figs.

[52] U.S. Cl. .................................................. 214/16.4 B, 104/48
[51] Int. Cl. .................................................. B65g 1/06
[50] Field of Search .................................................. 214/16.4 B, 16.4 R

[56] References Cited
UNITED STATES PATENTS

| 3,445,009 | 5/1969 | Burch .......................... | 214/16.4 B |
| 3,503,530 | 3/1970 | Burch et al. ................. | 214/16.4 B |
| 3,526,327 | 9/1970 | Atwater....................... | 214/16.4 B |

Primary Examiner—Gerald M. Forlenza
Assistant Examiner—Raymond B. Johnson
Attorney—Watts, Hoffmann, Fisher & Heinke ABSTRACT: A material-handling apparatus comprising a floor-supported traveling stacker unit having a horizontally movable load carrier supported for vertical movement along an upright mast horizontally movable in parallel aisles between tiered rows of storage compartments and a free-standing, floor-supported carrier or transfer unit movable transversely of the one end of the aisles into which one or more stacker units may be temporarily positioned for service and/or transfer from one storage aisle to another.

INVENTOR.
PAUL H. TROTH

BY Watts, Hoffmann, Fisher & Heinke
ATTORNEYS.

STORAGE STACKER UNIT AND A TRANSFER UNIT THEREFOR

TECHNICAL FIELD

This invention relates generally to manual and automatic warehouse systems having material-handling apparatus for moving material between loading and/or unloading stations and tiered rows of storage compartments arranged along one or both sides of a plurality of parallel aisles or from one such storage compartment to another.

PRIOR ART

Apparatus for transferring floor-supported stacker units from one aisle between tiered rows of storage compartments to another are known. One such apparatus is disclosed in a copending application of Stuart A. Martin, Ser. No. 797,571, filed Feb. 7, 1969, entitled Material Handling Apparatus.

SUMMARY OF THE INVENTION

This invention provides a novel and improved floor-supported, free-standing apparatus for handling and/or transferring from one aisle to another a stacker unit having a horizontally movable load support member vertically movable along a floor-supported upright mast horizontally movable in aisles between tiered rows of storage compartments. The apparatus is preferably capable of handling a plurality of stacker units at the same time.

This invention resides in certain constructions, combinations and arrangement of parts and in their mode of operation and further advantages thereof will be apparent to those skilled in the art to which it relates from the following description of the preferred embodiment.

DESCRIPTION OF PREFERRED EMBODIMENT

Figure 1:
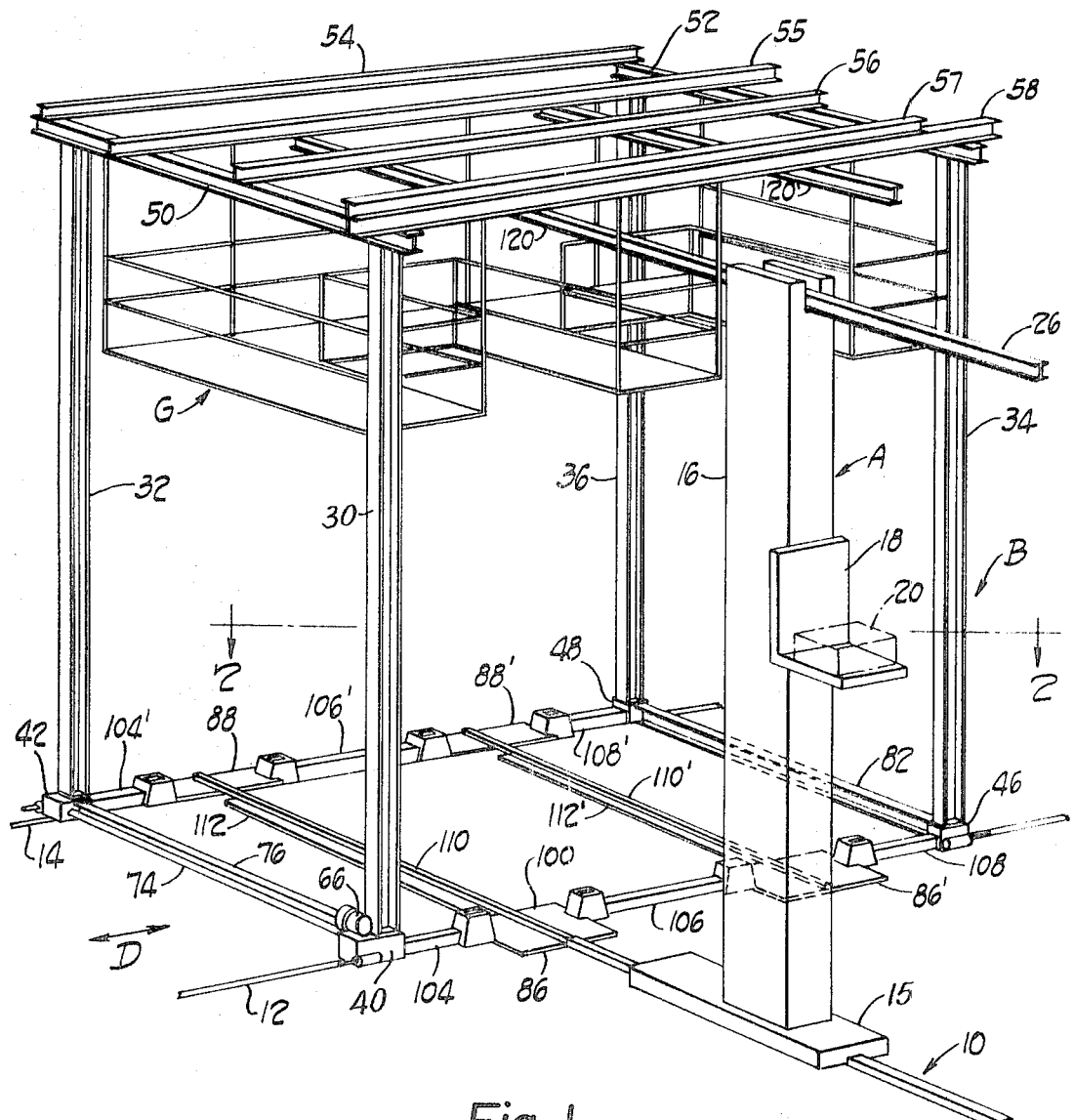
FIG. 1 is a fragmentary perspective view of a storage or warehouse area serviced by handling apparatus embodying the present invention.
Figure 2:
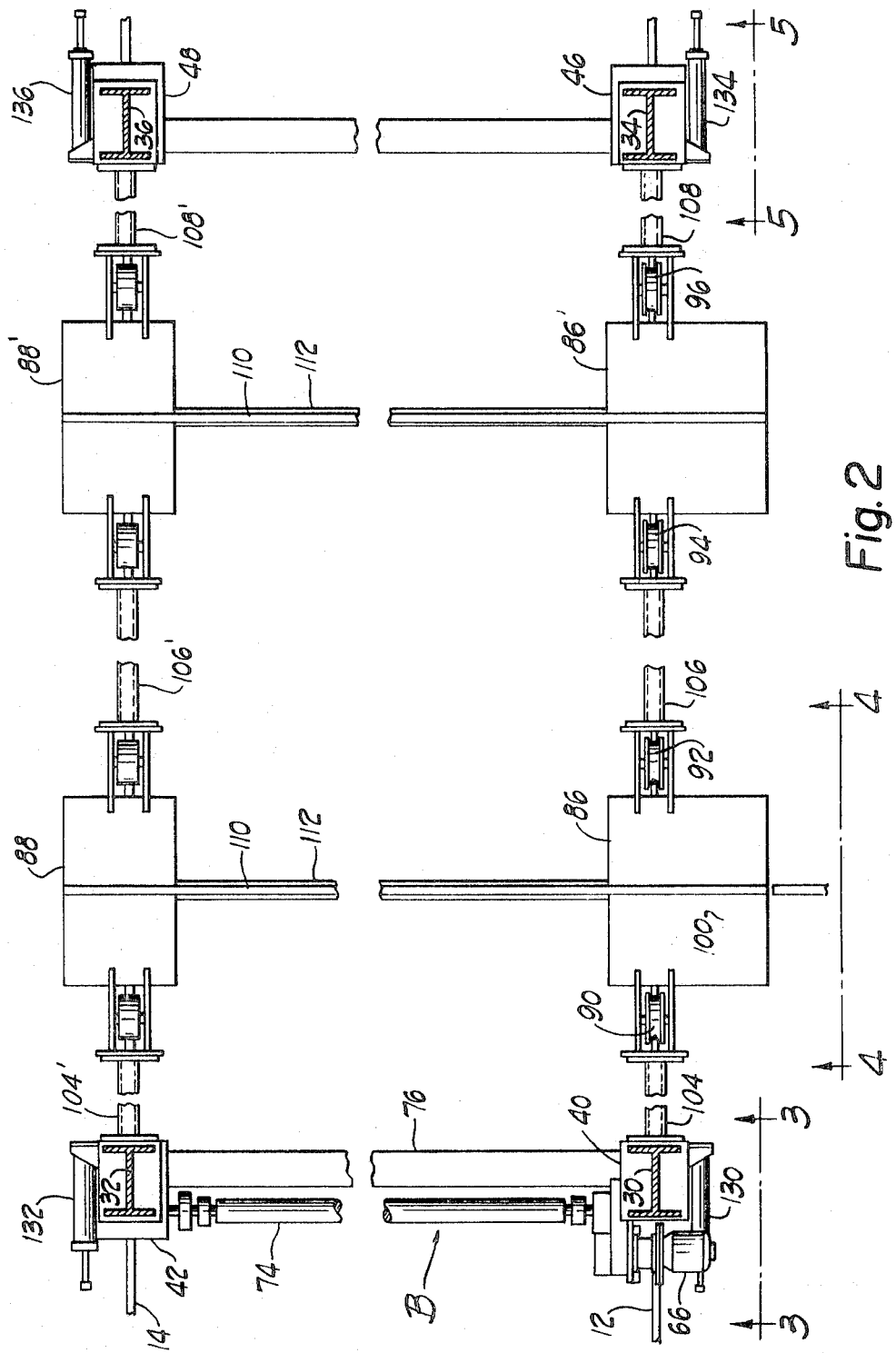
FIG. 2 is a horizontal sectional view approximately on the line 2—2 of FIG. 1.
Figure 3:
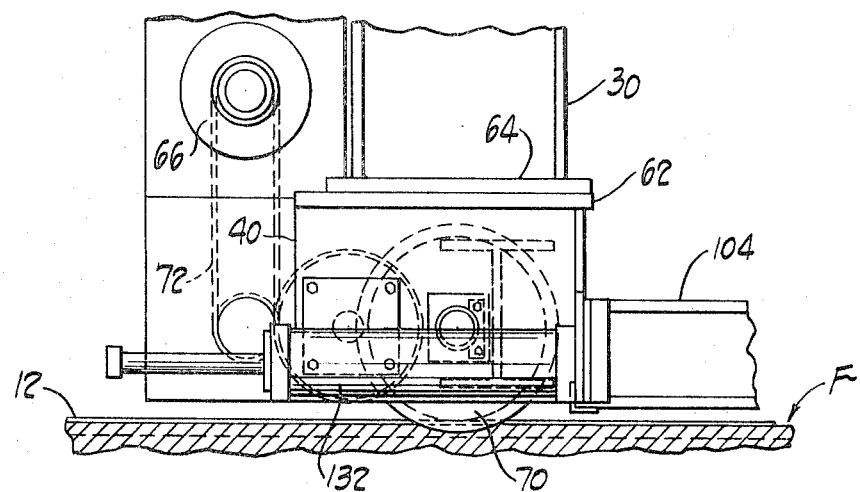
FIG. 3 is a fragmentary enlarged view approximately on the line 3—3 of FIG. 2.
Figure 4:
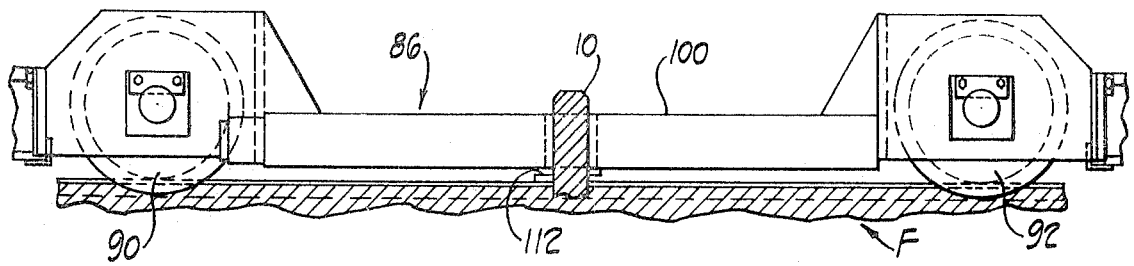
FIG. 4 is a fragmentary enlarged view approximately on the line 4—4 of FIG. 2.
Figure 5:
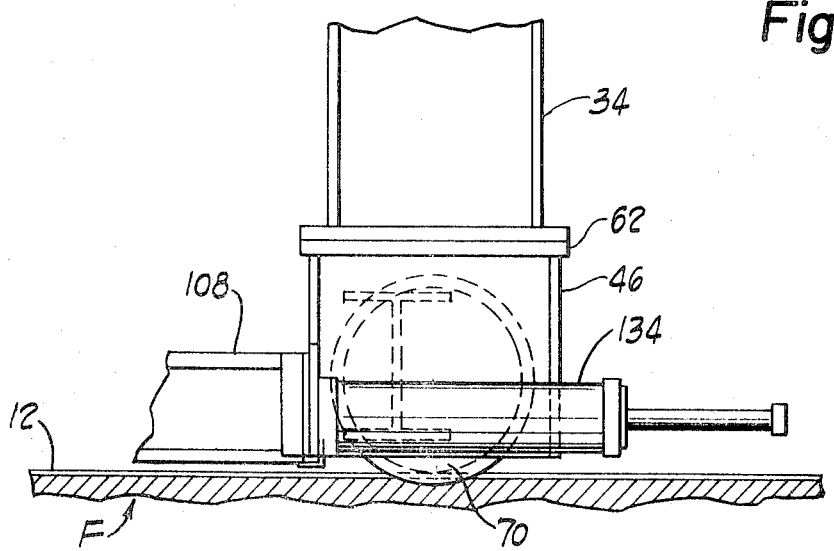
FIG. 5 is a fragmentary enlarged view approximately on the line 5—5 of FIG. 2.

The apparatus shown comprises a floor-supported stacker unit A and a floor-supported, free-standing transfer unit B capable of handling two stacker units simultaneously. The stacker unit A is selectively movable along one of a plurality of parallel floor-supported rails 10 in aisles between parallel rows of tiered storage compartments in a storage area in a known manner. The stacker handling and/or transfer unit B is movable along rails 12, 14 of runway D extending along one end of the aisles between the rows of tiered storage compartments. When it is desired to transfer a stacker unit A from one aisle to another it is moved into the stacker transfer unit B for movement along the runway D in a direction transversely of its movement between the rows of storage compartments, The stacker unit A, the construction of which, per se, forms no part of the present invention and which is merely shown diagrammatically in FIG. 1, includes a self-propelled carriage or car 15 provided with a vertically extending mast assembly 16 along which a load carrier 18 is vertically movable. The load carrier 18 is provided with a power-operated horizontally extensible load support 20 for projection into the storage compartments in the storage area at one or both sides of the aisles between rows of compartments. The carriage 15 is generally elongated in the direction of its movement in the aisles between the storage compartments, is relatively narrow to accommodate close spacing of the oppositely facing parallel rows of storage compartments, and is supported and moved in the aisles by running gear including wheels arranged in tandem and which ride on the rails 10. One or more of the wheels of the stacker unit are driven by reversible power means which may be either an electric or hydraulic motor. The mast assembly 16 extends upward from the frame of the car or carriage 15 and supports the load carrier 18 movable vertically therealong by a hoist at the head of the mast and connected to the load carrier by a cable. The load support 20 on the carrier 18 is movable by power, in a manner understood in the art, transversely of the length of the aisles between the storage compartments to deposit or pick up a load at a selected storage compartment. The upper end of the vertical mast assembly is stabilized and guided as the stacker unit moves in the aisles by overhead guide members or rails 26 located vertically above the tracks 10, opposite sides of which member 26 are engaged by rollers carried by the stacker unit A.

The warehouse system thus far described, except for the stacker transfer unit, may be generally similar to that shown and described in the aforesaid application of Stuart A. Martin, Ser. No. 797,571, filed Feb. 7, 1969, entitled Material Handling Apparatus to which reference is made for a more detailed description of the construction and arrangement of the stacker unit and storage compartments.

The stacker transfer unit B comprises a generally rectangular or boxlike built-up frame supported by and movable along the runway D comprising the floor-supported rails 12 and 14, the top sides of which are preferably level with or slightly above the level of the floor, designated F.

The frame of the transfer unit B includes vertically extending I-beams 30, 32, 34, 36 at the four corners thereof, the lower ends of which rest upon single wheeled units or corner trucks 40, 42, 44, 46, respectively. The vertical I-beams are suitably braced and the upper ends are connected together by horizontal I-beams 50, 52 extending transversely of the runway D and horizontal I-beams 54, 55, 56, 57 and 58 extending lengthwise of the runway D. The beams 54–58 rest upon and are connected to the transversely extending beams 50, 52.

The corner trucks are essentially alike except that the two left-hand trucks 40, 42 are provided with means for driving the rail-engaging wheels thereof. Each truck comprises a built-up frame 60 including a top plate 62 to which a plate 64 welded to the lower end of the I-beam supported thereby is detachably connected, as by being bolted thereto. In the case of the truck 40 the top plate 62 extends to the left and supports an electric motor 66 connected to the rail-engaging wheel 70 of the truck by a drive designated generally as 72. The rail-engaging wheels are rotatably supported in the frames of the trucks by suitable bearing means. The rail-engaging wheel of the truck 42 is adapted to be driven in timed relation to the wheel 70 from the motor 66 by a shaft 74 extending between the trucks 40, 42. The rear end of the shaft 74 is provided with a suitable pinion meshed with a gear concentric with the rail-engaging wheel of the truck 42.

The end trucks 40, 42 are held in predetermined spaced relation by an I-beam 76 connected to the respective frame members of the trucks 40, 42. The two trucks 46, 48 are connected to one another by an I-beam 82 in a manner similar to that in which the trucks 40, 42 are connected together. The trucks 40, 46 are connected to each other and held in spaced relation to one another by a pair of spaced two-wheeled trucks 86, 86', the wheels 90, 92 and 94, 96, respectively, of which engage and travel along the rail 12. The trucks are held in spaced relation to one another and to the trucks 40, 46 by a box-beam 104 connected to the truck 40 and to the truck 86, and similar beams 106, 108 connected to the truck 86 and the truck 86' and to the truck 86' and to the truck 46, respectively. The corner trucks 42, 48 are connected together in a manner similar to that in which the corner trucks 40, 46 are connected together with the exception of the fact that the frame members of the two wheeled trucks 88, 88' in the connection are narrower than the frame members of the trucks 86, 86'. The corresponding connecting box-beams are designated by the same reference characters with a prime mark affixed thereto.

The trucks 86, 88 and 86', 88' are similarly constructed and each comprise a built-up frame 100 in which the rail-engaging wheels are rotatably supported by suitable means. The trucks 86, 88 support opposite ends of a rail 110 adapted to be aligned with one of the storage area rails 10 for the transfer of a stacker unit A from a rail 10 to the rail 110 of the transfer unit B. The rail 110 connecting trucks 86, 88 is relatively long and flexible, and trucks 86, 88 can rock on rails 12, 14 with relative ease, such that as a stacker unit A moves onto the rail 110 the rail 110 will deflect and the truck frames will rock allowing the rail 110 to engage a bearing plate 112 on the floor surface underneath the rail 110 and thus restrain or restrict the transfer unit B from movement along the runway D. The carriage or car 15 is of a length substantially equal to the distance or spacing between the trucks 86 and 88. Thus, when the stacker unit A is positioned within the transfer unit B, the total weight of the stacker unit will be borne by the trucks 86 and 88. The frames of the trucks 86, 88, are rather stiff and the stiffness of the rail 110 is such that when the weight of the stacker unit A is more or less evenly distributed between the two trucks 86, 88, the rail 110 does not engage the bearing plate 112 thus leaving the transfer unit free for movement along the runway D.

When a stacker unit A is moved into the transfer unit B the guide rollers at the top of the mast 16 engage a guide member or rail 120 connected to the underside of the beams 45-58 and positioned with respect to the rail 110 such that the guide member 120 aligns with one of the guide member 26 when the rail 110 is aligned with the rail 10 therebelow.

The trucks 86', 88' are similar to the trucks 86, 88, and support a rail 110' above an abutment plate 112' when the transfer unit is positioned to align the rail 110' with one of the storage area tracks 10. For supporting or stabilizing the upper end of a stacker unit positioned on the rail 110' the transfer unit A includes an overhead rail 120' similar to the rail 120, previously referred to.

In anticipation that two or more transfer units B may be used on a single runway, such as the runway D, or that the runway D may terminate adjacent the wall of a building, the transfer unit B, shown herein, includes hydraulic shock absorber units 130, 132, 134, 136 connected to the corner trucks 40, 42, 46, 48, respectively. The shock absorbers are positioned horizontally and include bumper members extending horizontally beyond the ends of the frame of the transfer unit B to abut similar units on adjacent transfer units or a wall surface.

In order to facilitate maintenance of the stacker units A the transfer unit B is provided with a walkway, designated generally by the reference character G, suspended from the superstructure of the transfer unit. The walkway G provides ready access of personnel to at least three sides of a stacker unit positioned in the transfer unit.

The stacker unit B disclosed is capable of receiving and transferring two stacker units A simultaneously along the runway D. This facilitates transfer of the stacker units from one aisle of the storage area to another. Alternatively one of the two positions in the transfer unit can be used to store a stacker unit either during maintenance thereon or for substitution with another unit withdrawn from operation either temporarily or permanently. It is to be understood, however, that the transfer unit may be constructed to simultaneously accommodate any number of stacker units in which event the overall length of the transfer unit would be either shortened or lengthened accordingly.

From the foregoing description of the preferred material-handling apparatus it will be apparent that there has been provided a novel and improved warehouse or storage area comprising a free-standing unit for transferring stacker units from one aisle of the storage area to another and/or holding a transfer unit for maintenance and/or other purposes. It is the intention to hereby cover all modifications, adaptations and uses of the invention disclosed coming within the practice of those skilled in the art to which the invention relates and the scope of the appended claims.

Having thus described my invention, what I claim is:

1. In material-handling apparatus comprising a material stacker unit selectively movable along first paths defined by first rails in aisles between storage compartments and a transfer unit movable along a second set of rails defining a path transverse to the first paths for moving the stacker unit from one of the first paths to another, said stacker unit being movable on said first rails and including an elongated frame with a lower surface engaging running gear of a length substantially equal to the distance between said second set of rails, drive means for moving said stacker unit lengthwise in either of two opposite horizontal directions along a selected one of a plurality of first rails between storage compartments of a material storage area, a vertical mast extending upward from said frame, a vertically movable load support means, and means to move said load support means vertically and horizontally relative to said frame to transfer a load between said stacker unit and selected storage compartments, said transfer unit comprising a vertical boxlike frame with a lower surface engaging running gear adjacent the bottom corners thereof, drive means for moving said frame of the transfer unit in either of two opposite horizontal directions along said second set of rails, said frame of said transfer unit including first and second bottom members extending parallel to the path of movement of the transfer unit and spaced from one another in the direction normal to said path, said first and second bottom members being superimposed with respect to said second set of rails, each of said first and second bottom members comprising intermediate their ends spaced lower surface engaging running gear having spaced plate members interposed therein, said spaced plate members constituting means for supporting said stacker unit when positioned within said transfer unit for movement of said stacker unit by said transfer unit between said selected ones of said first rails, a flexible third bottom member having its opposite ends connected to said plate members of said first and second bottom members for partially supporting and guiding said stacker unit into and out of said transfer unit and being alignable with a selected one of said first rails, a plurality of fixed abutments along said second path in line with said first rails, said third bottom member being deflected under the weight of a stacker unit into engagement with a said fixed abutment therebeneath as said stacker unit is being moved on or off the transfer unit.